United States Patent [19]

Tojiki et al.

[11] 4,396,876
[45] Aug. 2, 1983

[54] MOTOR CONTROL APPARATUS

[75] Inventors: Hitomi Tojiki, Hachioji; Teruo Iwasawa, Mitaka, both of Japan

[73] Assignee: Olympus Optical Co., Ltd., Tokyo, Japan

[21] Appl. No.: 251,728

[22] Filed: Apr. 7, 1981

[30] Foreign Application Priority Data

Apr. 15, 1980 [JP] Japan .................................. 55/49454

[51] Int. Cl.³ .............................................. H02P 3/12
[52] U.S. Cl. .................................... 318/255; 318/379
[58] Field of Search ............... 318/255, 258, 261, 273, 318/269, 265, 369, 375, 379, 467, 466

[56] References Cited

U.S. PATENT DOCUMENTS

| | | | |
|---|---|---|---|
| 3,700,990 | 10/1972 | Shuey et al. | 318/375 |
| 3,854,080 | 12/1974 | Bambara et al. | 318/466 |
| 3,860,860 | 1/1975 | Moran et al. | 318/269 |

FOREIGN PATENT DOCUMENTS 2726810 of 0000 Fed. Rep. of Germany.

*Primary Examiner*—J. V. Truhe
*Assistant Examiner*—A. Evans
*Attorney, Agent, or Firm*—Frishauf, Holtz, Goodman & Woodward

[57] ABSTRACT

A motor control apparatus which includes a pulse generator for providing a first signal for specifying the operational condition of a motor, and a motor driver for providing a second signal for driving the motor when the first signal is at a first level and providing a second signal when the first signal is at a second level. The motor control apparatus further includes a comparator, which compares the back electromotive force of the motor with a reference level when the first signal is at the second level and providing a third signal when the back electromotive force is within a given level range prescribed by the reference level. A switch circuit closes a circuit path through which a back electromotive force current produced by the back electromotive force flows when the second and third signals are provided, thereby applying electromagnetic braking with respect to the rotation of the motor.

15 Claims, 7 Drawing Figures

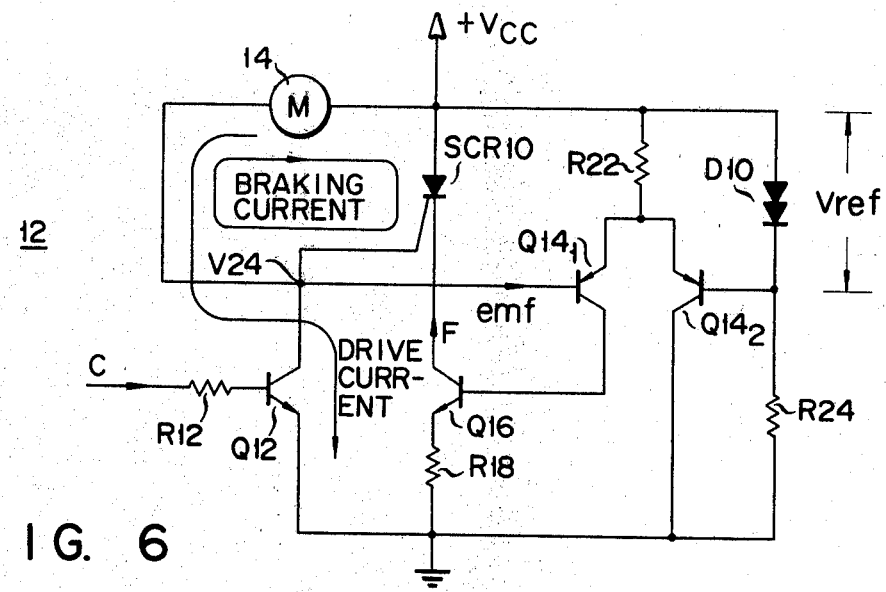
F I G. 6
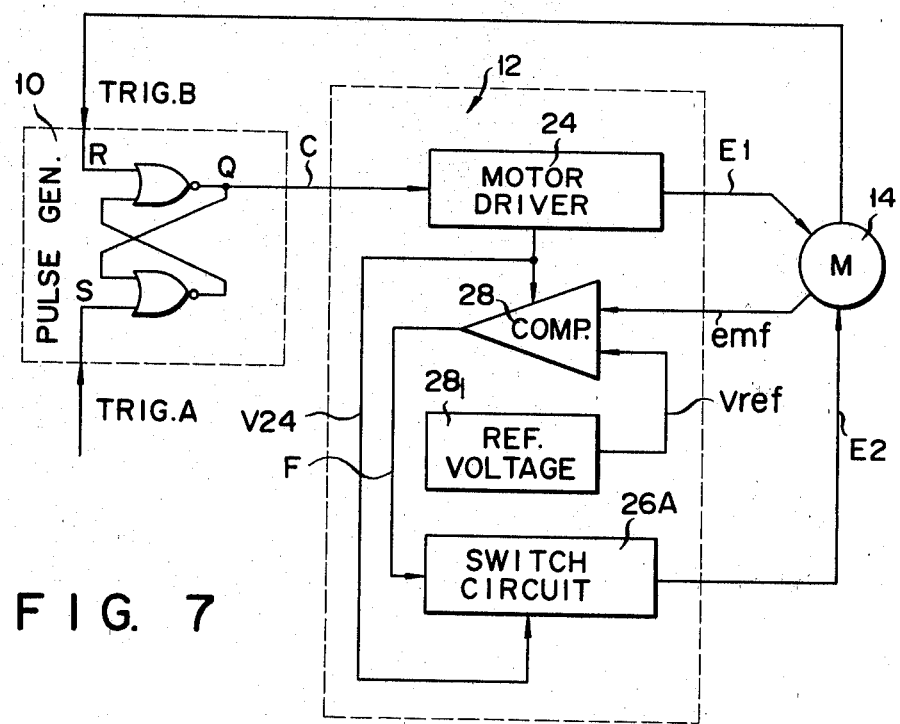
F I G. 7

MOTOR CONTROL APPARATUS

BACKGROUND OF THE INVENTION

This invention relates to a motor control apparatus for controlling the start, rotation and stop of a motor.

As a motor control system for controlling the start, rotation and stop of a motor, particularly a DC motor, there is one as shown in FIG. 1. It includes a pulse generator 10 which supplies a signal CD to a motor control section 12 when a trigger signal A is applied. The motor control section 12 supplies a signal E to a motor 14 in response to the signal CD, whereby the motor 14 is rotated, for instance in the clockwise direction. A shaft 16 of the motor 14 carries a rotary disc 20 secured to it and provided with a cam 18. A leaf switch 22 which is provided near the periphery of the rotary disc 20 is on-off operated as the cam 18 is rotated in unison with the motor 14. As the switch 22 is on-off operated, a trigger signal B is fed back to the pulse generator 10. When the trigger signal B is fed back, the state of the signal CD is altered. As a result, the signal E supplied to the motor 14 is switched to a polarity with which it tends to stop the inertial rotation of the motor 14, for instance from the positive to negative polarity. With the appearance of this signal, the rotation of the motor 14 is stopped in a short period of time. The motor control system as described above finds applications in lieu of a plunger mechanism in mechanisms where a magnetic head of a tape recorder is brought into contact with or separated from a magnetic tape according to the rotational angle of the motor 14.

FIG. 2 shows an example of the circuit construction of the motor control section 12, and FIG. 3 is a timing chart illustrating the operation of the circuit of FIG. 2. When the trigger signal A is changed in logic level from "0" to "1" at an instant t10 as shown in A in FIG. 3, a first signal C which goes to the logic level "1" at the instant t10 is generated from the pulse generator 10 as shown in C in FIG. 3. In correspondence to this first signal C, a signal E1 is supplied from a motor driver 24 to the motor 14. More particularly, during the logic level "1" period of the first signal C (from instant t10 to instant t12), the signal E1 is supplied to the motor 14 to cause the rotation thereof, for instance in the clockwise direction. When the motor 14 is rotated for a predetermined rotational angle (about 360° in FIG. 1), the switch 22 is turned off and on by the cam 18 at the instant t12, whereupon the trigger signal B is fed to the pulse generator 10. At this time, the first signal C goes back to the logic level "0" while a signal D goes to the logic level "1" as shown in C and D in FIG. 3 respectively. The signal D is supplied to a motor braking circuit 26. During the logic level "1" period of the signal D (from instant t12 to instant t14), the motor braking circuit 26 provides a signal E2 for stopping the inertial rotation of the motor 14. With this signal E2, the motor 14 is given a force tending to rotate it in the reverse direction and is thus quickly stopped. The period from the instant t10 to the instant t14 constitutes one start/stop cycle of the motor 14. With the construction of FIG. 2, however, means (10, 26) for forcibly stopping the motor 14 under the control of the switch 22 and signal D is required; otherwise, the rotor of the motor 14 will be allowed to continue the inertial rotation after the instant t14 in FIG. 3.

As is shown, according to the motor control system described above, means (18, 22) for providing the signals C and D for the two different lines and the trigger signal B are required. The provision of a plurality of signal paths and also the adoption of the means (18, 22) including mechanical contacts lead to the cost increase of the product utilizing such system and are also disadvantageous from the standpoint of reliability (faulty occurrence probability).

SUMMARY OF THE INVENTION

The invention is intended in the light of the above affairs, and its object is to provide a motor control apparatus, which can control the start, rotation and stop of a motor without use of the aforementioned means for providing the trigger signal B but with a signal path for a single line.

To achieve this object, the motor control apparatus according to the invention comprises means for providing a first signal for specifying the operational condition of a motor, drive means for driving the motor when the first signal is at a first level and providing a second signal when the first signal is at a second level, comparator means for comparing the back electromotive force of the motor with a reference level when the first signal is at the second level and providing a third signal when the back electromotive force is within a given level range prescribed by the reference level, and braking means for applying magnetic braking with respect to the rotation of the motor by shunting the back electromotive force current path of the motor when the second and third signals are provided.

With the motor control apparatus of the above construction, only a single signal, i.e., first signal, is needed for specifying the operational condition such as start, rotation and stop of the motor. That is, start, rotation and forcible stop of the motor can be caused according to the level of the first signal. This makes it unnecessary to provide means for generating a pulse specifying the stopping of the motor (i.e., trigger signal B), thus permitting the reduction of cost of the product to which the invention is applied and also contributing to the betterment of reliability.

BRIEF DESCRIPTION OF THE DRAWINGS

FIG. 6 is a circuit diagram showing a modification of the circuit of FIG. 5.

FIG. 7 is a block diagram, partly in circuit form, showing another modification of the circuit of FIG. 4.

DETAILED DESCRIPTION OF THE PREFERRED EMBODIMENTS

Figure 3:
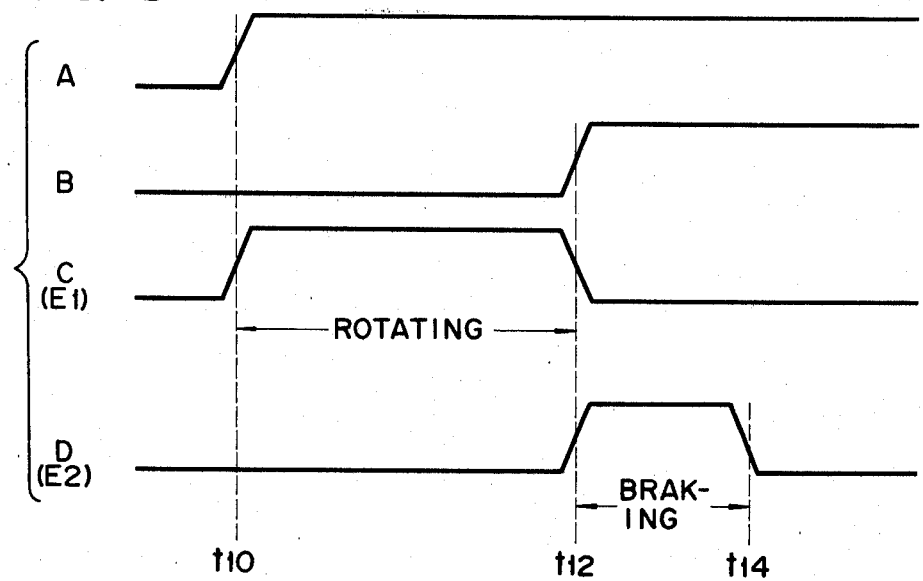
FIG. 3 is a timing chart illustrating the operation of the apparatus of FIGS. 2 and 5.
Figure 4:
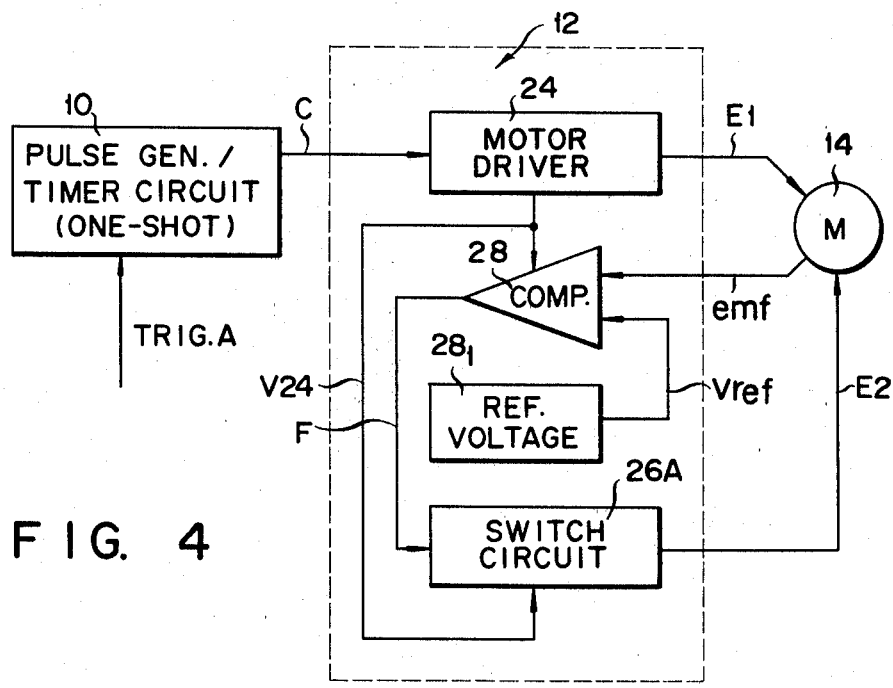
FIG. 4 is a block diagram showing an embodiment of the motor control apparatus according to the invention.

Before proceeding with the description of the embodiments of the invention, it will be expressly understood that like reference symbols are used to designate like portions throughout the drawings for simplicity of illustration and that the components designated by like reference symbols may easily be replaced with each other or one another with minor change thereof by a skilled person in the art. An embodiment of a motor control apparatus according to the invention will be described. Here, the operation after the instant t10 in FIG. 3 will be considered. Referring now to FIG. 4, when the first signal C of the logic level "1" is supplied to a motor driver 24 at the instant t10, the drive signal E1 for driving a motor 14 is supplied from the motor driver 24 to the motor 14. The signal E1 is generated at the same timing as the first signal C. The pulse duration (from instant t10 to instant t12) of the signal E1 or first signal C is suitably set by appropriately setting the time constant of a timer circuit (such as a monostable multivibrator triggered by the signal A) which is provided in a pulse generator 10, that is, the pulse duration of the first signal C can be set to correspond to, for instance, one rotation of the motor 14.

When the instant t12 is reached, the signals E1 and C are changed in logic level from "1" to "0", while at the same time a back electromotive force emf of the motor 14 and a reference voltage Vref are compared in a comparator 28. The reference voltage Vref is provided from a reference voltage source 28₁. While emf≧Vref, i.e., while emf is within a predetermined level range prescribed by Vref, a third signal F is provided from the comparator 28. This signal F is coupled to a switch circuit 26A which is used for braking the motor 14. With the appearance of the signal F, the motor driver 24 generates a second signal V24 which will be described later, and the switch circuit 26A generates a shunt signal E2 for shunting a back electromotive force current path of the motor 14. With the signal E2, electromagnetic braking is applied to the motor 14, that is, the inertial rotation of the rotor of the motor 14 is damped and stopped in a short period of time.

Figure 5:
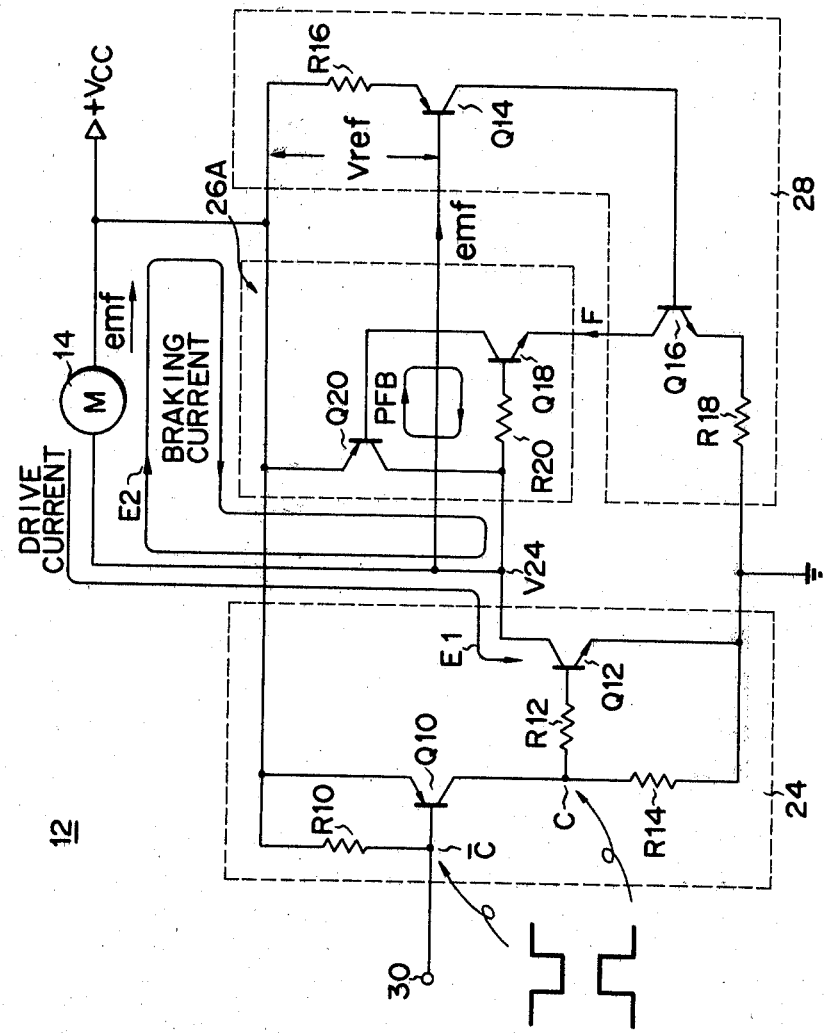
FIG. 5 is a circuit diagram showing a detailed circuit construction of the embodiment of FIG. 4.

FIG. 5 shows a specific circuit construction of the motor control section 12 shown in FIG. 4. A signal $\overline{C}$ coupled to an input terminal 30 corresponds to a level inverted signal from the first signal C. The terminal 30 is connected to a base of a PNP transistor Q10, which has its emitter connected to the positive side of a power supply +Vcc. A resistor R10 is connected between the base and emitter of the transistor Q10, and the collector thereof is connected through a resistor R12 to the base of an NPN transistor Q12. The collector of the transistor Q10 is grounded through a resistor R14, and the emitter of the transistor Q12 is directly grounded. The transistor Q10 serves as an inverter, and the first signal C which is of the opposite phase with respect to the signal $\overline{C}$ applied to the input terminal 30 is provided from the collector of the transistor Q10. The transistors Q10 and Q12 and resistors R10 to R14 form the motor driver 24 or motor drive means.

The collector of the transistor Q12 is connected to the base of a PNP transistor Q14, which has its emitter connected through a resistor R16 to the power supply positive side +Vcc. The potential difference between the power supply positive side +Vcc and the base of the transistor Q14 corresponds to the reference voltage Vref. The collector of the transistor Q14 is connected to the base of an NPN transistor Q16. The emitter of the transistor Q16 is grounded through a resistor R18. The transistors Q14 and Q16 and resistors R16 and R18 form a comparator 28 or comparator means. When the potential difference between the power supply positive side +Vcc and the base of the transistor Q14 exceeds the aforementioned voltage Vref, the transistors Q14 and Q16 are turned on, whereupon the third signal F appears from the collector of the transistor Q16. The signal F at this time, corresponds to the collector current in the transistor Q16.

The collector of the transistor Q16 is connected to the emitter of an NPN transistor Q18, which has its collector connected to the base of a PNP transistor Q20 and its base connected through a resistor R20 to the collector of the transistor Q20. The transistor Q20 has its emitter connected to the power supply positive side +Vcc and its collector connected to the collector of the transistor Q12. The transistors Q18 and Q20 and resistor R20 constitute the switch circuit 26A or braking means. The resistor R20 has a function of preventing overcurrent into the base of the transistor Q18 when the transistor Q20 is turned on.

The collector of the transistor Q12, base of the transistor Q14 and collector of the transistor Q20 are connected through the motor 14 to the power supply positive side +Vcc. The aforementioned drive signal E1, i.e, drive current, is provided from the collector of the transistor Q12, the back electromotive force emf is applied to the base of the transistor Q14, and a braking current or back electromotive force current corresponding to the aforementioned shunt signal E2 is provided from the collector of the transistor Q20.

The operation of the circuit shown in FIG. 5 will now be described. During the period from the instant t10 to the instant t12 in FIG. 3, the transistors Q10 and Q12 are both "on", thus providing the drive current (i.e., signal E1) to the motor 14. With this current, the motor 14 is rotated a predetermined amount (for instance one rotation). When the instant t12 corresponding to the end of the predetermined rotation is reached, the signal $\overline{C}$ is changed in logic level from "0" to "1". During the process of this logic level change, the transition or shift of the transistor Q12 from the "on" state to the "off" state takes place. More particularly, when the instant t12 is reached, the collector current (drive current) of the transistor Q12 is reduced, and the collector potential V24 of the transistor Q12 (which is equal to the base potential of the transistor Q14) is thus increased toward the potential +Vcc. At this time, the transistors Q14 and Q16 are still both "on". The potential V24 corresponds to the second signal mentioned before. The transistor Q18 is turned on when the potential V24 comes to satisfy a condition:

$$V24 \geq VBE18 + VCE(SAT)16 + R18IE16 \quad \ldots (1)$$

where VBE18 represents the threshold voltage between the base and emitter of the transistor Q18, VCE(SAT)16 the saturation voltage between the collector and emitter of the transistor Q16, and IE16 the emitter current in the transistor Q16.

When the formula (1) is satisfied at the instant t12, the transistors Q18 and Q20 are momentarily turned on. This occurs due to a positive feedback (PFB) action of the circuit between the base of the transistor Q18 and the collector of the transistor Q20. With this PFB action, the voltage supplied to the motor 14 momentarily goes to a lower level. The momentary conduction of the transistors Q18 and Q20 brought about is equivalent to the action of a thyristor triggered at the gate thereof. This PFB action occurs under a condition $$VCE20 \geq VBE14 + R16IE14 \quad \ldots (2)$$

where VBE14 is the threshold voltage between the base and emitter of the transistor Q14, and IE14 is the emitter current in the transistor Q14.

After the instant t12, the transistor Q12 is "off", and thus no power is supplied to the motor 14. At this time, the motor 14 undergoes inertial rotation and thus generates the back electromotive force emf. The back electromotive force current (E2) that stems from this back electromotive force emf is shunted by the emitter-collector path of the transistor Q20. With this shunting, a braking current flows through the motor 14 to apply strong electromagnetic braking to the rotor of the motor 14. For this reason, the motor 14 is forcibly stopped in a short period of time after the instant t12 at which the transistor Q20 is turned on.

The transistor Q20 is held "on" so long as the conditions of the formulas (1) and (2) are satisfied. As the rotational speed of the rotor of the motor 14 is reduced by the electromagnetic braking mentioned above, the back electromotive force emf is quickly reduced. When the rotation of the motor 14 is slowed down to a point at which a condition $$emf < Vref = VBE14 + R16 IE14 \qquad (3)$$

is satisfied, the transistor Q14 is turned off, whereupon the third signal F, i.e., the collector current in the transistor Q16, is reduced to zero. As a result, the transistors Q18 and Q20 are turned off to release the electromagnetic braking. At this moment, however, the motor 14 is almost sopped. Assuming that the conditions of the formulas (1) and (2) are satisfied during the period from the instant t12 till the instant t14, the electromagnetic braking is applied during this period, during which the second signal V24 mentioned above and the third signal F are provided. When the formula (3) is satisfied at the instant t14, the third signal F vanishes to release the electromagnetic braking. In other words, the switch circuit 26A constitutes the braking means which, when the second signal V24 and third signal F are provided, shunts the back electromotive force current path of the motor 14 to thereby cause the electro-mangetic braking to be applied with respect to the rotation of the motor 14.

Referring to FIG. 5, if IE14 is equal to the base current IB16 in the transistor Q16, the aforementioned reference voltage Vref is given as $$Vref = VBE14 + R16 IE14 \cong VBE14 + \frac{R16}{R18}\left(\frac{Vcc - VBE20}{h_{FE16}}\right) \cong VBE14 \qquad (4)$$

where VBE20 is the threshold voltage between the base and emitter of the transistor Q20 and $h_{FE16}$ (>>1) is the current amplification factor of the transistor Q16.

This means that the reference level Vref for comparison in the comparator 28 is determined practically by VBE14. It is now assumed that VBE14=700 mV, the temperature coefficient of VBE14 is set to $\partial VBE/\partial T = 2$ mV/°C., and the ambient temperature is subject to variation over a range from −10° C. to +50° C. In this case, the temperature change of Vref is given as $$\frac{\partial Vref}{\partial T} = \frac{(\partial VBE14/\partial T) \times (50 + 10)}{VBE14} \times 100 = \qquad (5)$$

-continued
$$\frac{2\ mV/°C. \times 60° C.}{700\ V} \times 100 \cong 17\%/60° C. \cong 0.28\%\ °C.$$

Also, with the supply voltage +Vcc of 3 V, collector saturation voltage VCE(SAT)12 of the transistor Q12 of 0 V and VBE14 of 0.7 V, the voltage supplied to the motor 14 in the "on" state of the transistor Q12 is 0.7 V. Then assuming the temperature variation range to be from −10° C. to +50° C., the temperature characteristic of the motor braking action (i.e., the temperature characteristic regarding the condition under which the braking current flows) is given as $$\frac{(\partial VBE14/\partial T) \times (50 + 10)}{Vcc - VBE14} \times 100 \cong \qquad (6)$$

$$\frac{2\ mV/°C. \times 60° C.}{3\ V - 0.7\ V} \times 100 \cong 5.2\%/60° C. \cong 0.09\%/°C.$$

The formulas (5) and (6) indicate that, where the motor control apparatus shown in FIG. 5 according to the invention is applied to an actual motor control system, practically a constant control characteristic can be obtained over the utility temperature range from −10° C. to +50° C. It is also experimentally confirmed that the circuit of FIG. 5 provides satisfactory control characteristics regardless of the variation of the supply voltage (+Vcc) over a range from 1.8 V to 4.5 V. Further, with the circuit construction of FIG. 5 the power consumption of the circuit 12 can be held zero in the state of absence of an input pulse, i.e., when the signal $\overline{C}$ is at the logic leval "1" (+Vcc level).

The motor control apparatus according to the invention has the following advantages.

(1) Only a single designation signal (C or $\overline{C}$) for specifying the operational state (start, rotation and stop) of the motor 14 is necessary, and the construction can thus be simplified; for example, when implementing the circuit of FIG. 5 with an IC, only one connection pin for the designation signal mentioned above is necessary.

Figure 1:
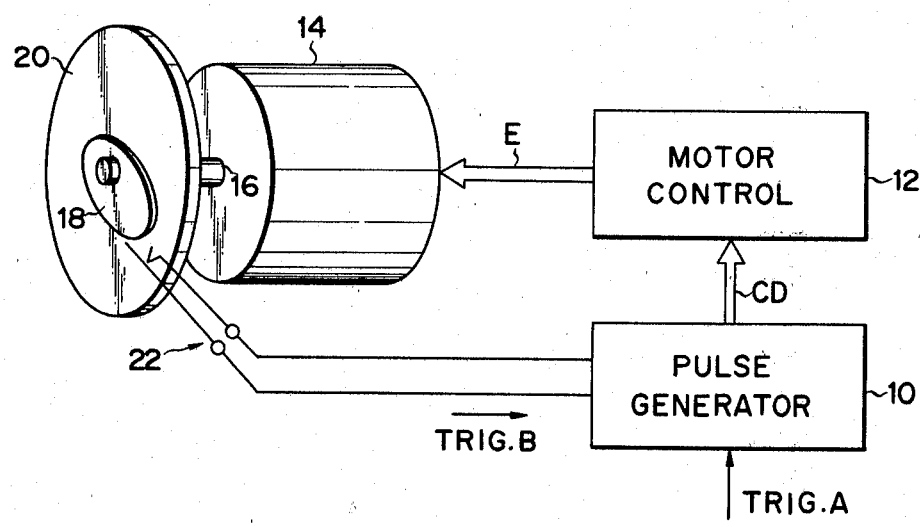
FIG. 1 is a schematic representation of a motor control system, to which the invention pertains.
Figure 2:
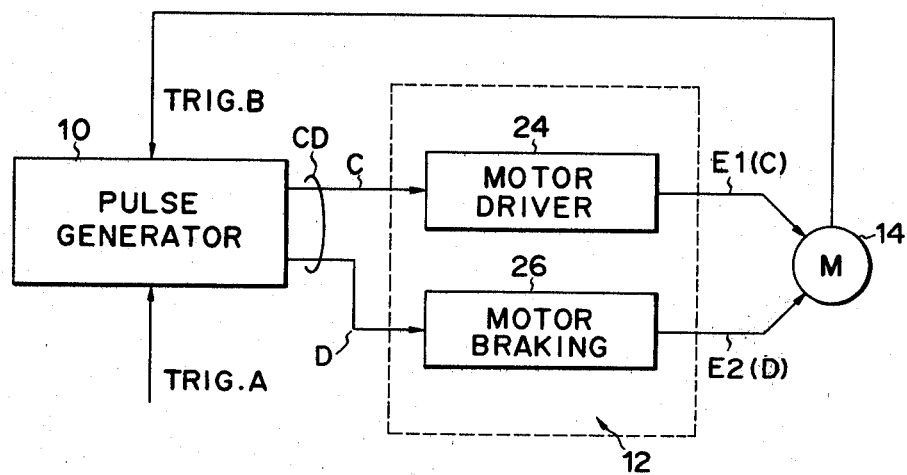
FIG. 2 is a block diagram showing a motor control circuit based upon the construction shown in FIG. 1.

(2) The means for providing a signal for forcibly stopping the motor 14 (such as the switch 22 and cam 18 for producing the trigger signal B in the system of FIG. 1) is not required, and the trouble or malfunction of the system is thus less prone.

(3) Superior function of quickly stopping the motor 14 can be obtained in case where the braking means 26A includes a PFB loop as in the system of FIG. 5.

While one preferred embodiment of the invention has been described with reference to the drawings, it is by no means limitative, and various changes and modifications are possible without departing from the scope and spirit of the invention as defined in the claims. For example, the switch circuit 26A may be replaced with a thyristor SCR 10 as shown in FIG. 6. Also, the comparator 28 may replaced with a constant voltage circuit (D10 and R24) for providing the voltage Vref and differential comparator circuit (Q14, Q14$_2$ and R22). Further, the timer circuit with an R-S flip-flop as shown in FIG. 7 for the pulse generator 10 may additionally be used. Still further, the motor control apparatus according to the invention may be used in combination with a motor control apparatus disclosed in Japanese Patent Application No. 20050/80 filed by the same applicants and assigned to the same assignee.

What we claim is:
1. A motor control apparatus comprising:

a motor generating a back electromotive force when in rotation;

designation means for providing a signal for specifying the operational condition of said motor;

drive means coupled to said designating means to said motor for driving said motor when said first signal is at a first level and for providing a second signal when said first signal is at a second level;

comparator means coupled to said motor for comparing the back electromotive force of said motor with a reference level when said first signal is at said second level and for providing a third signal at a terminal when said back electromotive force is within a given level range prescribed by said reference level; and braking means coupled to said motor applying magnetic braking with respect to the rotation of said motor by shunting the path through which the back electromotive current flows when said second and third signals are provided, said braking means including a switch circuit forming a positive feedback loop and turned on when applying electromagnetic braking to said motor, said switch circuit including a thyristor-connected semiconductor switch connected in series with the current path of the back electromotive force current, said semiconductor switch including:

a first switching transistor having a base, an emitter connected to one end of said motor and a collector connected to the other end of said motor; and a second switching transistor having a base connected to the collector of said first switching transistor, a collector connected to the base of said first switching transistor and an emitter connected to a terminal to which said third signal is applied, said back electromotive force current flowing through the emitter-collector path of said first switching transistor.

2. A motor control apparatus comprising:

a motor generating a back electromotive force when in rotation;

designation means for providing a first signal for specifying the operational condition of said motor;

drive means coupled to said designating means and to said motor for driving said motor when said first signal is at a first level and for providing a second signal when said first signal is at a second level;

comparator means coupled to said motor for comparing the back electromotive force of said motor with a reference level when said first signal is at said second level and for providing a third signal at a terminal when said back electromotive force is within a given level range prescribed by said reference level; and braking means coupled to said motor applying magnetic braking with respect to the rotation of said motor by shunting the path through which the back electromotive current flows when said second and third signals are provided;

said comparator means including:

a first comparison transistor which is turned on when the back electromotive of said motor force exceeds the reference level; and an on-off transistor connected to said braking means and to first comparison transistor, for providing said third signal when said first comparison transistor is turned on.

3. An apparatus according to claim 1, wherein said semiconductor switch further includes a current limiting resistor connected between the collector of said first switching transistor and the base of said second switching transistor for preventing an overcurrent flowing into the base of said second switching transistor.

4. An apparatus according to claim 1 or 3, wherein said comparator means includes:

a first comparison transistor which is turned on when the back electromotive of said motor force exceeds the reference level; and an on-off transistor connected to said braking means and to first comparison transistor, for providing said third signal when said first comparison transistor is turned on.

5. An apparatus according to claim 4, wherein said reference level corresponds to the base potential of said first comparison transistor.

6. An apparatus according to claim 1 or 3, comprising a source of a trigger signal to start said motor; and wherein said designation means includes a timer circuit rendered operative by said trigger signal for providing said first signal for a period of time corresponding to a predetermined extent of rotation of said motor.

7. An apparatus according to claim 4, comprising a source of a trigger signal to start said motor; and wherein said designation means includes a timer circuit rendered operative by said trigger signal for providing said first signal for a period of time corresponding to a predetermined extent of rotation of said motor.

8. An apparatus according to claim 5, comprising a source of a trigger signal to start said motor; and wherein said designation means includes a timer circuit rendered operative by said trigger signal for providing said signal for a period of time corresponding to a predetermined extent of rotation of said motor.

9. An apparatus according to claim 1 or 3, comprising a source of first trigger signal for starting said motor and a source of a second trigger signal which is generated when said motor is rotated to a predetermined extent; and wherein said designation means includes a flip-flop set by said first trigger signal for starting said motor and reset by said second trigger signal generated when said motor is rotated to said predetermined extent, said flip-flop thereby providing said first signal.

10. An apparatus according to claim 4, comprising a source of first trigger signal for starting said motor and a source of a second trigger signal which is generated when said motor is rotated to a predetermined extent; and wherein said designation means includes a flip-flop set by said first trigger signal for starting said motor and reset by said second trigger signal generated when said motor is rotated to said predetermined extent, said flip-flop thereby providing said first signal.

11. An apparatus according to claim 5, comprising a source of first trigger signal for starting said motor and a source of a second trigger signal which is generated when said motor is rotated to a predetermined extend; and wherein said designation means includes a flip-flop set by said first trigger signal for starting said motor and reset by said second trigger signal generated when said motor is rotated to said predetermined extent, said flip-flop thereby providing said first signal.

12. An apparatus according to claim 2, wherein said braking means includes a switch circuit forming a positive feedback loop and turned on when applying electromagnetic braking to said motor.

13. An apparatus according to claim 2, comprising a source of a trigger signal to start said motor; and wherein said designation means includes a timer circuit rendered operative by said trigger signal for providing said first signal for a period of time corresponding to a predeter ined extent of rotation of said motor.

14. An apparatus according to claim 2, wherein said reference level corresponds to the base potential of said first comparison transistor.

15. An apparatus according to claim 14, comprising a source of a trigger signal to start said motor; and wherein said d-signation means includes a timer circuit rendered operative by said trig-er signal for providing said first signal for a period of time corresponding to a predetermined extent of rotation of said motor.

* * * * *